United States Patent
Langegger

(10) Patent No.: US 10,900,397 B2
(45) Date of Patent: Jan. 26, 2021

(54) METHOD FOR DETERMINING THE LOADING STATE OF A PARTICLE FILTER OF A MOTOR VEHICLE

(71) Applicant: Dr. Ing. h.c. F. Porsche Aktiengesellschaft, Stuttgart (DE)

(72) Inventor: Michael Langegger, Kornwestheim (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 16/416,286

(22) Filed: May 20, 2019

(65) Prior Publication Data

US 2019/0390582 A1    Dec. 26, 2019

(30) Foreign Application Priority Data

Jun. 20, 2018 (DE) .................. 10 2018 114 779

(51) Int. Cl.
*F01N 3/021* (2006.01)
*F01N 9/00* (2006.01)
*F01N 11/00* (2006.01)

(52) U.S. Cl.
CPC ............ *F01N 3/021* (2013.01); *F01N 9/002* (2013.01); *F01N 11/007* (2013.01);
(Continued)

(58) Field of Classification Search
CPC ............ F01N 11/007; F01N 2430/06; F01N 2550/04; F01N 2560/025; F01N 2560/08;
(Continued)

(56) References Cited

U.S. PATENT DOCUMENTS

| 8,398,742 B2 * | 3/2013 | Tylutki .................... F01N 3/103 95/20 |
| 8,826,730 B2 * | 9/2014 | Koizumi ............ B01D 46/0057 73/114.76 |

(Continued)

FOREIGN PATENT DOCUMENTS

| DE | 102004017522 A1 | 11/2004 |
| DE | 102004017522 A1 | 6/2016 |

(Continued)

*Primary Examiner* — Jesse S Bogue
(74) *Attorney, Agent, or Firm* — Leydig, Voit & Mayer, Ltd.

(57) ABSTRACT

A method for determining a loading state of a particle filter of a motor vehicle. The method includes detecting a first differential pressure across the particle filter, determining a second differential pressure across the particle filter, and subjecting each of the first differential pressure and the second differential pressure to a filtering process in order to determine a filtered first differential pressure and a filtered second differential pressure. The method further includes subjecting each of the first filtered differential pressure and the second filtered differential pressure to an integration process in order to determine a first integral of the filtered first differential pressure and a second integral of the filtered second differential pressure, synchronizing the first integral and the second integral with one another to provide synchronized integrals, and determining, as the loading state, a ratio which is dependent on the synchronized integrals.

19 Claims, 2 Drawing Sheets

(52) U.S. Cl.
CPC ...... *F01N 2430/06* (2013.01); *F01N 2550/04* (2013.01); *F01N 2560/025* (2013.01); *F01N 2560/14* (2013.01); *F01N 2900/0421* (2013.01); *F01N 2900/1606* (2013.01)

(58) Field of Classification Search
CPC ......... F01N 2560/14; F01N 2900/0418; F01N 2900/0421; F01N 2900/1606; F01N 3/021; F01N 9/002
See application file for complete search history.

(56) References Cited

U.S. PATENT DOCUMENTS

| | | | |
|---|---|---|---|
| 2004/0204818 A1 | 10/2004 | Trudell et al. | |
| 2009/0320452 A1* | 12/2009 | Gioannini | F01N 13/0097 60/277 |
| 2011/0010071 A1* | 1/2011 | Rhodes | F01N 9/002 701/102 |
| 2013/0145822 A1* | 6/2013 | Karlsson | F01N 9/002 73/23.31 |
| 2016/0186630 A1* | 6/2016 | Osburn | F01N 11/00 60/274 |
| 2016/0186636 A1* | 6/2016 | Odendall | F01N 11/00 60/273 |
| 2017/0159535 A1* | 6/2017 | Hall | F01N 9/002 |

FOREIGN PATENT DOCUMENTS

| | | |
|---|---|---|
| EP | 1528229 B1 | 4/2012 |
| EP | 1529931 B1 | 5/2012 |

* cited by examiner

METHOD FOR DETERMINING THE LOADING STATE OF A PARTICLE FILTER OF A MOTOR VEHICLE

CROSS REFERENCE TO RELATED APPLICATIONS

This application claims benefit to German Patent Application No. DE 10 2018 114 779.1, filed Jun. 20, 2018, which is hereby incorporated by reference herein.

FIELD

The invention relates to a method for determining the loading state of a particle filter of a motor vehicle.

BACKGROUND

Modern motor vehicles are known to have particle filters which, in particular, serve to filter out particles, such as for example fine dust particles and/or soot particles, from an exhaust gas stream of the motor vehicle. In this context, it is already known from practice to determine what is referred to as the loading state of the particle filter in order to perform, in particular, regeneration of the particle filter when the loading state of the particle filter with particles filtered out of the exhaust gas is too large. Hitherto, the precise, reliable and simple determination of the loading state of a particle filter of a motor vehicle presented difficulties.

EP 1 528 229 B1 discloses a method by means of which it is possible to estimate a quantity of particles which are precipitated in a filter for trapping diesel particles. For this purpose, according to EP 1 528 229 B1, a first increased quantity of particles is detected on the basis of a pressure difference across the particle filter. On the basis of an integrated value, obtained by means of integration, a second increased quantity of particles is detected. It is proposed to determine correction data for correcting the integrated value and to correct the integrated value using this correction data. The particle filter is regenerated on the basis of the corrected integrated value or the pressure difference across the filter.

EP 1 529 931 B1 has also disclosed determining a collected quantity of particles in a filter for trapping particles of engine exhaust gas and regenerating the particle filter as a function thereof. For this purpose, a first estimated value of a collected quantity of particles is determined by means of a first estimation means, on the basis of the exhaust gas differential pressure of the particle filter. The collected quantity of particles of the filter is estimated using a second estimation means, on the basis of the engine operating status. A selection unit is configured to select one of the estimation results and to determine the regeneration time of the particle filter as a function thereof.

SUMMARY

In an embodiment, the present invention provides a method for determining a loading state of a particle filter of a motor vehicle. The method includes detecting a first differential pressure across the particle filter by a measuring using a differential pressure sensor, determining a second differential pressure across the particle filter by computation using a differential pressure model, and subjecting each of the first differential pressure and the second differential pressure to a filtering process in order to determine a filtered first differential pressure from the first differential pressure and a filtered second differential pressure from the second differential pressure. The method further includes subjecting each of the first filtered differential pressure and the second filtered differential pressure to an integration process in order to determine a first integral of the filtered first differential pressure and a second integral of the filtered second differential pressure, synchronizing the first integral and the second integral with one another to provide synchronized integrals, and determining, as the loading state, a ratio which is dependent on the synchronized integrals.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
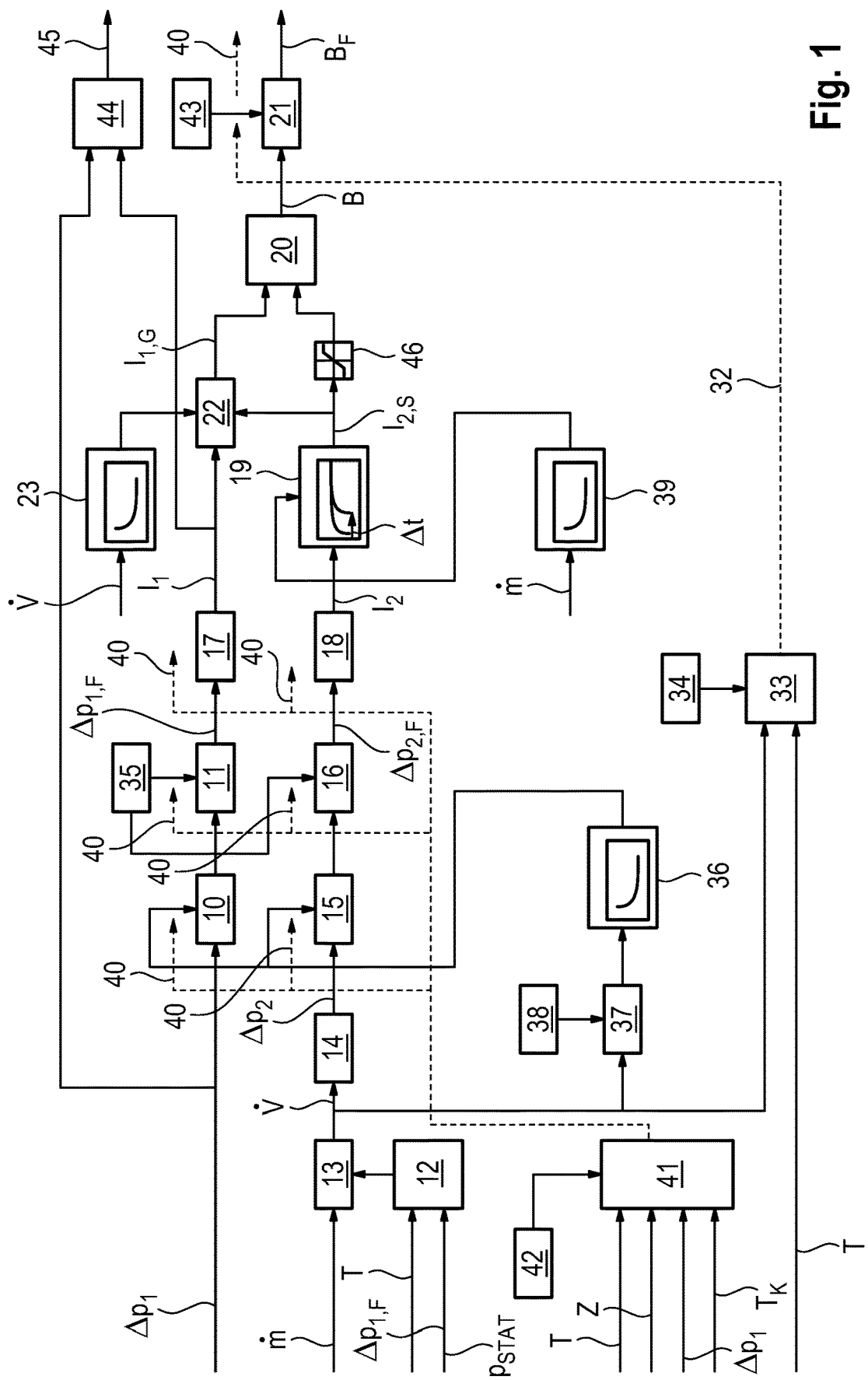
FIG. 1 shows a block circuit diagram illustrating a method according to an embodiment of the invention for determining a loading state of a particle filter of a motor vehicle.

Embodiments of the invention to provide novel methods for determining the loading state of a particle filter of a motor vehicle. In a method according to embodiments of the invention for determining the loading state of a particle filter of a motor vehicle, a first differential pressure across the particle filter is detected by measuring technology using a differential pressure sensor. In the method according to embodiments of the invention, furthermore, a second differential pressure across the particle filter is determined by computation using a differential pressure model.

In the method according to embodiments of the invention, the first differential pressure and the second differential pressure are each subjected to a filtering process, in order to determine a filtered first differential pressure and a filtered second differential pressure.

In the method according to embodiments of the invention, the first filtered differential pressure and the second filtered differential pressure are each subjected to an integration process, in order to determine a first integral of the filtered first differential pressure and a second integral of the filtered second differential pressure.

The first integral and the second integral are synchronized with one another in the method according to the invention.

According to the invention, a ratio which is dependent on the integrals which are synchronized with one another is determined as a loading state.

With the present invention, the loading state of a particle filter of a motor vehicle can be determined easily, reliably and precisely. This is based, in particular, on the fact that filtered differential pressures, which are on the one hand measured and on the other hand determined by computation on the basis of a model, are each integrated, wherein the integrals which are determined in the process are synchronized with one another. Ultimately the loading state is determined as a function of the integrals, which are synchronized with one another, of the filtered differential pressures.

Inaccuracies in the determination of the loading state, which arise from a previously unconsidered phase shift between the first differential pressure which is detected by measuring technology and the second differential pressure which is determined by computation can be compensated or eliminated as a result of the filtering of the differential pressures, the integration of the differential pressures and the synchronization of the integrals.

According to one advantageous development, the first integral and the second integral are synchronized with one another in such a way that a delay is impressed on the second integral. As a result, the synchronization can take place particularly advantageously. The delay which is impressed on the second integral is preferably dependent on an operating point, in particular the rotational speed of an internal combustion engine and/or an exhaust gas mass flow of the internal combustion engine. This also serves for the particularly advantageous synchronization of the integrals of the filtered differential pressures.

The first integral is preferably weighted as a function of an operating point, in particular of the rotational speed of an internal combustion engine and/or an exhaust gas mass flow of the internal combustion engine. A ratio between the integrals which are synchronized with one another, specifically a ratio of the weighted first integral and the second integral, on which a delay is impressed, is determined as a loading state. By means of the weighting it is possible to eliminate a measuring error of the differential pressure sensor at low exhaust gas mass flows or exhaust gas volume flows.

According to one advantageous development, the second differential pressure across the particle filter is determined by computation using the differential pressure model in such a way that the second differential pressure, which is dependent on a calculated volume flow upstream of the particle filter, is corrected by means of a temperature-dependent factor. The calculated volume flow upstream of the particle filter is preferably calculated as a function of the static pressure upstream of the particle filter which is corrected as a function of the filtered first differential pressure.

According to one advantageous development of the invention, a static offset of the differential pressure sensor is compensated in such a way that in the event of an engine cold start and when an ignition system is activated a current static offset of the differential pressure sensor is stored, that in the event of an engine warm start and when the ignition system is activated the stored static offset of the differential pressure sensor remains stored, and that the filtering is initialized as a function of the static offset. In this way, the influence of an offset of the differential pressure sensor can advantageously be compensated.

The invention relates to a method for determining the loading state of a particle filter of a motor vehicle.

The particle filter can be a particle filter for a motor vehicle having a spark ignition engine or else a particle filter for a motor vehicle having a diesel engine. Particle filters for a motor vehicle having a spark ignition engine are also referred to as spark-ignition particle filters.

The determination of the loading state of the particle filter is based on two differential pressures. A first differential pressure across the particle filter is detected by measuring technology using a differential pressure sensor. A second differential pressure across the particle filter is determined by computation using a differential pressure model. Both the first differential pressure and the second differential pressure are each subjected to a filtering process, in order to determine a filtered first differential pressure and a filtered second differential pressure. Both filtered differential pressures are respectively subjected to an integration process, in order to determine a first integral of the filtered first differential pressure and a second integral of the filtered second differential pressure. The two integrals are synchronized with one another. A ratio which is dependent on the integrals which are synchronized with one another is determined as a loading state. Further details of the invention are described below with reference to the figures.

FIG. 1 shows a block circuit diagram of a method according to an embodiment of the invention for determining the loading state of a particle filter of a motor vehicle.

A first differential pressure $\Delta p_1$ is detected by measuring technology using a differential pressure sensor. As stated above, this first differential pressure $\Delta p_1$ which is detected by measuring technology is subjected to a filtering process, to be precise firstly to a digital low-pass filtering process in a block 10 and subsequently to a digital high-pass filtering process in a block 11, wherein the output variable of the block 11 is a first filtered differential pressure $\Delta p_{1,F}$.

The low-pass filtering process in block 10 and the high-pass filtering process in block 11 together make available a bandpass filtering process for the first differential pressure $\Delta p_1$ which is detected by measuring technology.

As already stated, the determination of the loading state of the particle filter is based not only on the first differential pressure $\Delta p_1$ which is detected by measuring technology but also on a second differential pressure $\Delta p_2$ which is determined by computation using a differential pressure model.

This second differential pressure $\Delta p_2$ is determined by computation in the blocks 12, 13 and 14 which represent the differential pressure model, wherein the second differential pressure $\Delta p_2$, like the first differential pressure $\Delta p_1$, is subjected to a filtering process, in order to determine a filtered second differential pressure $\Delta p_{2,F}$. The filtering of the second differential pressure $\Delta p_2$ which is determined by computation is based, like the filtering of the first differential pressure $\Delta p_1$ which is detected by measuring technology, on a bandpass filtering process which is composed of a digital low-pass filtering process in block 15 and a downstream digital high-pass filtering process in block 16.

A first integral $I_1$ of the filtered first differential pressure $\Delta p_1$ is determined over time from the first filtered differential pressure $\Delta p_{1,F}$ in a block 17. In a block 18, a second integral $I_2$ is determined over the time of the filtered second differential pressure $\Delta p_{2,F}$.

The synchronization of the two integrals $I_1$ and $I_2$ with one another takes place in a block 19, wherein according to FIG. 1 the first integral $I_1$ and the second integral $I_2$ are synchronized with one another in the block 19 in such a way that a delay $\Delta t$ is impressed on the second integral $I_2$ via the block 19.

This delay $\Delta t$ which is impressed on the second integral $I_2$ is dependent on the operating point of the motor vehicle, in particular on the rotational speed of the internal combustion engine of the motor vehicle and/or on the exhaust gas mass flow $\dot{m}$ of the internal combustion engine. The output variable of the block 19 is the second integral $I_{2,S}$ which is synchronized with the first integral $I_1$.

In a block 20, a ratio which corresponds to a loading state B of the particle filter is formed as a function of the two integrals $I_1$ and $I_{2,S}$ which are synchronized with one another. This output variable of the block 20, that is to say the loading state B, can be subjected to a filtering process in a block 21, in order then to make available a filtered loading state $B_F$.

As already stated, the determination of the loading state B or $B_F$ of the particle filter is carried out at a second differential pressure $\Delta p_2$ which is calculated using a differential pressure model.

This differential pressure model for calculating the second differential pressure $\Delta p_2$ is illustrated in FIG. 1 by means of the blocks 12, 13 and 14. In block 12, a density of the exhaust gas which is placed in a relationship with the exhaust gas mass flow $\dot{m}$ of the internal combustion engine in a block 13, in order ultimately to calculate the second differential pressure $\Delta p_2$ as a function of a polynomial equation in block 14, is determined in block 12 as a function of a temperature T of the exhaust gas upstream of the particle filter and as a function of a static pressure $p_{STAT}$ upstream of the particle filter.

The second differential pressure $\Delta p_2$ is preferably determined by computation by means of the following formulas (1) and (2):

$$\Delta p_2 = \left[ a*(\dot{V})^2 + b*\dot{V} \right] * X(T) \quad (1)$$

$$\dot{V} = \frac{\dot{m}*T*R}{p_{STAT}+\Delta p_{1,F}} \quad (2)$$

where:
$\dot{V}$ is the calculated volume flow upstream of the particle filter,
$X(T)$ is the temperature-dependent factor,
a, b are constants,
$\dot{m}$ is an exhaust gas mass flow of the internal combustion engine upstream of the particle filter,
T is the temperature of the exhaust gas upstream of the particle filter,
R is the gas constant of the exhaust gas,
$p_{STAT}$ is the static pressure upstream of the particle filter, and
$\Delta p_{1,F}$ is the filtered first differential pressure.

The above formula (1) corresponds here to the polynomial of the block 14. The above formula (2) corresponds to the calculation of the volume flow upstream of the particle filter via the blocks 12, 13.

From the above formula (1) it follows that in block 14 the second differential pressure $\Delta p_2$ is corrected as a function of the temperature-dependent factor $X(T)$. The temperature T is here the temperature of the exhaust gas upstream of the particle filter. This correction factor can be stored in a characteristic curve, a characteristic diagram or a table on the control side.

The determination of the volume flow $\dot{V}$ upstream of the particle filter is, according to formula (2), dependent not only on the static pressure $p_{STAT}$ upstream of the particle filter but, according to the above formula (2), also dependent on the filtered first differential pressure $\Delta p_{1,F}$. By this means, ultimately the second differential pressure $\Delta p_2$ across the particle filter can be advantageously calculated using the differential pressure model.

In the preferred exemplary embodiment shown, the first integral $I_1$ of the filtered first differential pressure $\Delta p_1$ is weighted in a block 22. The weighting in block 22 is dependent here, in particular, on the operating point of the motor vehicle, preferably on the rotational speed of the internal combustion engine of the motor vehicle and/or on the exhaust gas mass flow $\dot{m}$ of the internal combustion engine and/or dependent on the calculated volume flow $\dot{V}$ of the exhaust gas upstream of the particle filter.

From FIG. 1 it can be inferred that the output variable of the block 19, that is to say the second integral $I_{2,S}$ which is synchronized with the first integral, and, on the other hand, an output variable of a block 23 are fed as input variables to the block 22, wherein the output variable of the block 23 is dependent on the calculated volume flow $\dot{V}$ upstream of the particle filter. In the block 22, the first integral $I_1$ of the filtered first differential pressure $\Delta p_{1,F}$ is weighted in order thereby to make available a weighted first integral $I_{1,G}$ as an output variable. A fault of the differential pressure sensor at low mass flows or volume flows across the particle filter can be compensated or eliminated by means of the weighting, specifically by virtue of the fact that at low mass flows or volume flows a small weighting factor is selected and accordingly the first integral $I_1$ is only included on a percentage basis in the determination of the loading state B.

The loading state B in FIG. 1 is the ratio $I_{1,G}/I_{2,S}$.

Figure 2:
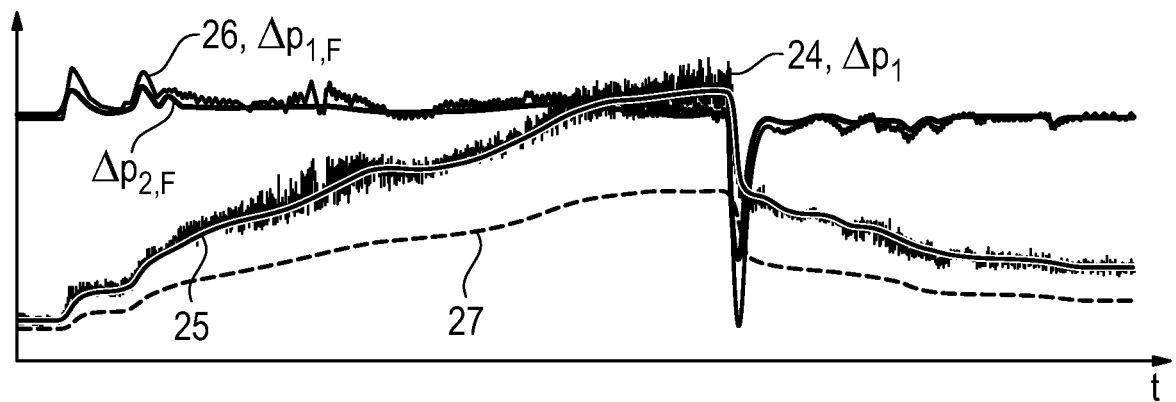
FIG. 2 illustrates example time diagrams according to the method of FIG. 1.
Figure 2:
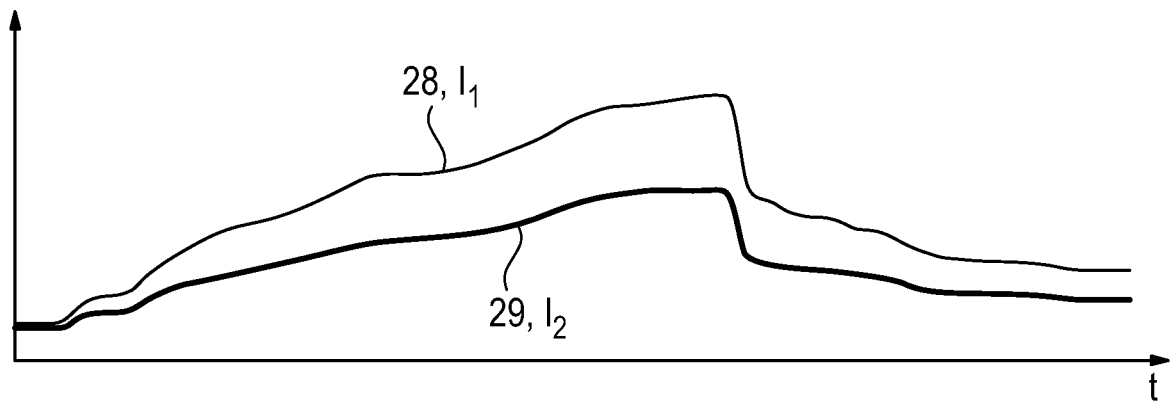
Figure 2:
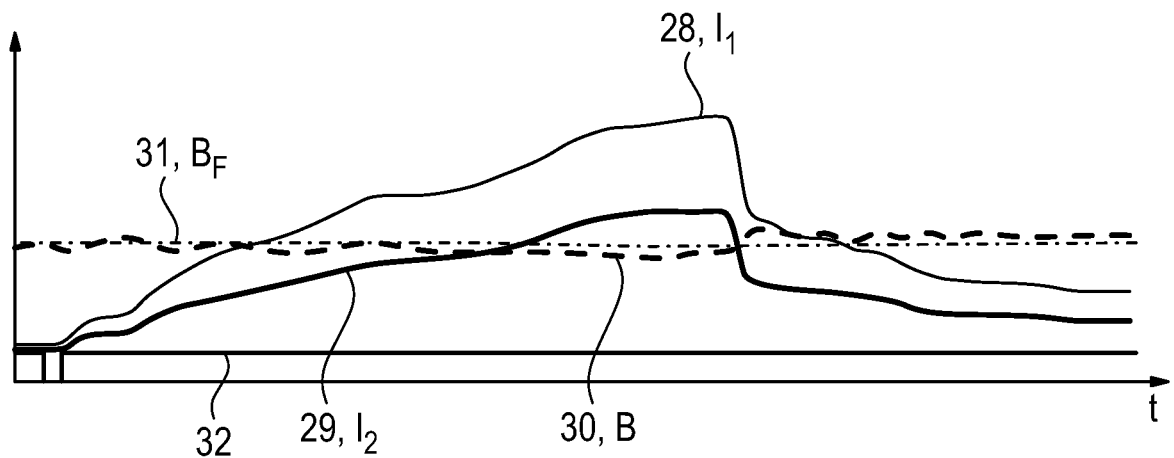

A plurality of chronological signal profiles are shown plotted against the time t in FIG. 2. The signal profile 24 is a raw value of the measured value of the differential pressure sensor, that is to say the pressure $\Delta p_1$ which is detected by measuring technology. The curve profile 25 is the output variable of the block 10, that is to say the low-pass-filtered first differential pressure $\Delta p_1$ which is detected by measuring technology. The curve profile 26 illustrates the output variable of the block 11, that is to say the bandpass-filtered first differential pressure $\Delta p_{1,F}$. The curve profile 27 shows the output variable of the block 15, that is to say the low-pass-filtered second differential pressure $\Delta p_2$, and the curve profile 28 illustrates the output variable of the block 16, that is to say the bandpass-filtered second differential pressure $\Delta p_{2,F}$.

The curve profile 28 in FIG. 2 corresponds to the output variable of the block 17, that is to say to the first integral $I_1$ of the filtered first differential pressure $\Delta p_{1,F}$. The curve profile 29 corresponds to the output variable of the block 18, that is to say to the second integral $I_2$ of the filtered second differential pressure $\Delta p_{2,F}$.

From FIG. 2 it can be inferred that the output variable $I_1$ of the block 17, that is to say the integral of the filtered first differential pressure $\Delta p_{1,F}$, exhibits a significantly smoothed profile. Despite the multiple filtering and integration processes, the signal $I_1$ can represent the dynamics well.

Moreover, by selecting corresponding filter values for the blocks 10, 11, 15 and 16 it is also possible to implement a relatively minor phase shift by means of the filtering.

The curve profiles 28 and 29, that is to say the two integrals $I_1$ and $I_2$, are in turn shown at the bottom of FIG. 2, and a curve profile 30 likewise illustrates the output variable of the block 20, that is to say the loading state B, and a curve profile 31 illustrates the output variable of the block 21, that is to say the filtered loading state $B_F$.

According to one advantageous development of the invention, the loading state B or $B_F$ is determined only when the calculated volume flow $\dot{V}$ upstream of the particle filter is greater than a limiting value. The curve profile 32 in FIG. 2 shows a corresponding enable signal which is determined in the block 33 in FIG. 1. A block 34 provides the block 33 with the corresponding limiting value for the volume flow $\dot{V}$ upstream of the particle filter, which limiting value is itself calculated in block 13. In addition, the temperature T upstream of the particle filter is made available to the block 33 as an input variable, in order to determine, as a function of this temperature T, a corresponding temperature-dependent limiting value for enabling the determination of the loading state.

As already stated, the blocks 10 and 15 are concerned with the low-pass filtering, and the blocks 11, 16 with the high-pass filtering process of the bandpass filtering process of the respective differential pressure $\Delta p_1$ and $\Delta p_2$.

The filter parameters for the high-pass filtering process 11, 16 are kept available in the block 35. The filter parameters for the low-pass filtering process 10, 15 are determined in block 36 in dependence on a characteristic curve, to be precise as a function of the volume flow $\dot{V}$ of the exhaust gas upstream of the particle filter which is made available by the block 13.

This volume flow $\dot{V}$, that is to say the output variable of the block 13, is filtered in a block 37, preferably high-pass-filtered, to be precise as a function of a filter constant which is made available by the block 38, wherein the filtered volume flow, that is to say the output variable of the block 37, serves as an input variable for the characteristic diagram or the characteristic curve of the block 36, in order to determine the filter constants for the low-pass filtering processes 10, 15 as a function thereof.

As already stated above, the synchronization of the second integral $I_2$ with the first integral $I_1$ for determining the synchronized second integral $I_{2,S}$ is dependent on the operating state of the motor vehicle, in particular on the rotational speed of the internal combustion engine and/or on the exhaust gas mass flow $\dot{m}$ of the internal combustion engine.

In FIG. 1, the delay $\Delta t$, which is impressed on the second integral $I_2$, in order to determine the second integral $I_{2,S}$ which is synchronized with the first integral $I_1$, is determined in a block 39 in dependence on a characteristic curve and as a function of the exhaust gas mass flow $\dot{m}$ of the internal combustion engine.

FIG. 1 indicates, with an arrow 40, initialization for the calculation or determination of the loading B or $B_F$, wherein in this context the low-pass filtering processes of the blocks 10, 15, the high-pass filtering processes of the blocks 11, 16 and the integration of the blocks 17, 18 are also initialized. This initialization signal 40 is the output variable of the block 41 in FIG. 1. The initialization of the blocks 11, 15, 16, 17 and 18 preferably takes place with the value zero (0). The block 21 is preferably initialized with the value one (1). The block 10 is initialized with a static offset of the differential pressure sensor.

The arrows or initialization signals 40 are accordingly three corresponding initialization signals, specifically a first initialization signal for the blocks 11, 15, 16, 17, 18, in particular the value "0", a second initialization signal for the block 21, in particular the value "1", and an initialization signal for the block 10, which is preferably initialized with the static offset of the differential pressure sensor. The block 41 outputs these initialization signals 40 as output variables.

The initialization of the low-pass filtering process in the block 10 serves to compensate or eliminate the static offset of the differential pressure sensor. In the case of a motor cold start and when an ignition system is activated a current static offset of the differential pressure sensor is stored. If, on the other hand, the ignition process takes place during an engine warm start, the previously stored static offset remains stored. As already stated, when the enable signal 32 is present the initialization is carried out, wherein as described above the low-pass filtering process in the block 10 is initialized with the static offset. The temperature T of the exhaust gas upstream of the particle filter is fed as an input variable to the block 41. Further input variables of the block 41 are an ignition signal Z relating to the activation of the ignition system, the measured first differential pressure $\Delta p_1$ and the temperature $T_K$ which corresponds to the temperature information of the internal combustion engine. Depending on the temperature $T_K$ it is possible to decide whether an engine cold start or engine warm start is occurring. The signal Z provides information about the activation of the ignition system. If the ignition system is activated, the static offset of the differential pressure sensor can be determined as a function of the signal $\Delta p_1$. In order to check whether an engine cold start is occurring, the temperature $T_K$ is compared with a threshold value which is made available by the block 42.

The above initialization takes place after the ignition, preferably in a defined sequence. Firstly, the initialization of the block 10 occurs with the static offset of the differential pressure sensor. Subsequently, the initialization of the blocks 11, 15, 16, 17, 18 occurs with the value "0". Finally, the initialization of the block 21 occurs with the value "1".

A block 43 in FIG. 1 illustrates a further function of the invention, which corresponds to influencing the filtering of the block 21 for determining the filtered loading state $B_F$. The block 43 monitors the operating state of the motor vehicle and conditions in order to open the filter value of the filtering process in the block 21, with the result that the filtering process is less effective. Then, if the block 43 detects that the particle filter is very hot and the exhaust gas is becoming enriched with oxygen, the filtering process of the block 21 can be opened. The reason for this is that under these peripheral conditions burning off of soot in the particle filter is promoted, as a result of which the differential pressure across the particle filter can then change suddenly.

A block 44 in FIG. 1 relates to the compensation or determination of drifting of the differential pressure sensor over time. The measured differential pressure $\Delta p_1$ and the unweighted first integral $I_1$ of the filtered first differential pressure $\Delta p_{1,F}$ are then made available as input variables to the block 44, wherein the block 44 outputs a sensor drift as an output variable 45. This sensor drift can be used to correct the measured differential pressure $\Delta p_1$.

A block 46 in FIG. 1 serves for optionally protecting the synchronized second integral $I_{2,S}$.

The invention is particularly preferably used to determine the loading state of a spark-ignition particle filter.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for determining a loading state of a particle filter of a motor vehicle, the method comprising:
   detecting a first differential pressure across the particle filter by a measuring using a differential pressure sensor;
   determining a second differential pressure across the particle filter by computation using a differential pressure model;
   subjecting each of the first differential pressure and the second differential pressure to a respective filtering process in order to determine a filtered first differential pressure from the first differential pressure and a filtered second differential pressure from the second differential pressure;
   subjecting each of the first filtered differential pressure and the second filtered differential pressure to a respective integration process in order to determine a first integral of the filtered first differential pressure and a second integral of the filtered second differential pressure;
   synchronizing the first integral and the second integral with one another to provide synchronized integrals, wherein the first integral and the second integral are synchronized with one another in such a way that a delay is impressed on the second integral; and
   determining, as the loading state, a ratio which is dependent on the synchronized integrals wherein the first integral is weighted as a function of a rotational speed of an internal combustion engine and/or as a function of an exhaust gas mass flow of the internal combustion engine to provide a weighted first integral, wherein the weighted first integral and the second integral are synchronized with one another to provide the synchronized integrals, and wherein the ratio determined as the loading state is a ratio of the weighted first integral and the second integral.

2. The method as claimed in claim 1, wherein the first filtered differential pressure and the second filtered differential pressure are each subjected to an integration process over time.

3. The method as claimed in claim 1, wherein the delay which is impressed on the second integral is dependent on an operating point, wherein the operating point is a rotational speed of an internal combustion engine and/or an exhaust gas mass flow of the internal combustion engine.

4. The method as claimed in claim 1, further comprising filtering the ratio of the weighted first integral and the second integral in order to determine a filtered loading state.

5. The method as claimed in claim 1, wherein the second differential pressure across the particle filter is determined by computation using the differential pressure model in such a way that the second differential pressure, which is dependent on a calculated volume flow upstream of the particle filter, is corrected by a temperature-dependent factor.

6. The method as claimed in claim 5, wherein the second differential pressure is determined by computation according to the following formulas:

$$\Delta p_2 = \left[a*(\dot{V})^2 + b*\dot{V}\right]*X(T); \text{ and } \dot{V} = \frac{\dot{m}*T*R}{p_{STAT} + \Delta p_{1,F}}$$

wherein:
$\dot{V}$ is the calculated volume flow upstream of the particle filter,
$X(T)$ is the temperature-dependent factor,
a, b are constants,
$\dot{m}$ is an exhaust gas mass flow of the internal combustion engine upstream of the particle filter,
T is a temperature of the exhaust gas upstream of the particle filter,
R is a gas constant of the exhaust gas,
$p_{STAT}$ is a static pressure upstream of the particle filter, and
$\Delta p_{1,F}$ is the filtered first differential pressure.

7. The method as claimed in claim 5, wherein the loading state is determined only when the calculated volume flow upstream of the particle filter is greater than a limiting value.

8. The method as claimed in claim 7, wherein the respective filtering process to which the first differential pressure is subjected is a bandpass filtering process composed of a low-pass filtering process and a subsequent high-pass filtering process, wherein the low-pass filtering process is initialized with a static offset of the differential pressure sensor, and wherein the high-pass filtering process and the integration are initialized with zero.

9. The method as claimed in claim 1, wherein each respective filtering process to which the first differential pressure and the second differential pressure are subjected is a bandpass filtering process composed of a low-pass filtering process and a subsequent high-pass filtering process.

10. The method as claimed in claim 9, wherein the low-pass filtering process of the respective filtering process to which the first differential pressure is subjected is initialized with a static offset of the differential pressure sensor.

11. The method as claimed in claim 1, wherein a sensor drift of the differential pressure sensor is determined over time, and the sensor drift is used to correct the first differential pressure is corrected by means of the sensor drift,
   wherein the sensor drift is a function of the first differential pressure and the unweighted first integral of the filtered first differential pressure.

12. A method for determining a loading state of a particle filter of a motor vehicle, the method comprising:
   detecting a first differential pressure across the particle filter by a measuring using a differential pressure sensor;
   determining a second differential pressure across the particle filter by computation using a differential pressure model, the second differential pressure across the particle filter being dependent on a calculated volume flow upstream of the particle filter;
   subjecting each of the first differential pressure and the second differential pressure to a respective filtering process in order to determine a filtered first differential pressure from the first differential pressure and a filtered second differential pressure from the second differential pressure;
   subjecting each of the first filtered differential pressure and the second filtered differential pressure to a respective integration process in order to determine a first integral of the filtered first differential pressure and a second integral of the filtered second differential pressure;
   synchronizing the first integral and the second integral with one another to provide synchronized integrals; and
   determining, as the loading state, a ratio which is dependent on the synchronized integrals, wherein the second differential pressure across the particle filter is determined by computation using the differential pressure model in such a way that the second differential pressure is corrected by a temperature dependent factor, and wherein the calculated volume flow upstream of the particle filter is calculated as a function of a static pressure upstream of the particle filter which is corrected as a function of the filtered first differential pressure.

13. The method as claimed in claim 12, wherein the first integral is weighted as a function of a rotational speed of an internal combustion engine and/or as a function of an exhaust gas mass flow of the internal combustion engine to provide a weighted first integral, wherein the weighted first integral and the second integral are synchronized with one another to provide the synchronized integrals, and wherein the ratio determined as the loading state is a ratio of the weighted first integral and the second integral.

14. The method as claimed in claim 12, wherein the respective filtering process to which the first differential pressure is subjected is a bandpass filtering process composed of a low-pass filtering process and a subsequent high-pass filtering process, wherein the low-pass filtering process is initialized with a static offset of the differential pressure sensor, and wherein the high-pass filtering process and the integration are initialized with zero.

15. A method for determining a loading state of a particle filter of a motor vehicle, the method comprising:

detecting a first differential pressure across the particle filter by a measuring using a differential pressure sensor;

determining a second differential pressure across the particle filter by computation using a differential pressure model;

subjecting each of the first differential pressure and the second differential pressure to a respective filtering process in order to determine a filtered first differential pressure from the first differential pressure and a filtered second differential pressure from the second differential pressure, subjecting each of the first filtered differential pressure and the second filtered differential pressure to a respective integration process in order to determine a first integral of the filtered first differential pressure and a second integral of the filtered second differential pressure;

synchronizing the first integral and the second integral with one another to provide synchronized integrals; and determining, as the loading state, a ratio which is dependent on the synchronized integrals, wherein a static offset of the differential pressure sensor is compensated in such a way that:

in an event of an engine cold start and when an ignition system is activated, a current static offset of the differential pressure sensor is stored, and in an event of an engine warm start and when the ignition system is activated, the stored static offset of the differential pressure sensor remains stored, and the respective filtering process to which the first differential pressure is subjected is initialized with the static offset.

16. The method as claimed in claim 15, wherein the first integral and the second integral are synchronized with one another in such a way that a delay is impressed on the second integral.

17. The method as claimed in claim 16, wherein the first integral is weighted as a function of a rotational speed of an internal combustion engine and/or as a function of an exhaust gas mass flow of the internal combustion engine to provide a weighted first integral, wherein the weighted first integral and the second integral are synchronized with one another to provide the synchronized integrals, and wherein the ratio determined as the loading state is a ratio of the weighted first integral and the second integral.

18. The method as claimed in claim 15, wherein each respective filtering process to which the first differential pressure and the second differential pressure are subjected is a bandpass filtering process composed of a low-pass filtering process and a subsequent high-pass filtering process.

19. The method as claimed in claim 18, wherein the low-pass filtering process of the respective filtering process to which the first differential pressure is subjected is initialized with a static offset of the differential pressure sensor.

* * * * *